(12) United States Patent
Jones et al.

(10) Patent No.: US 8,922,568 B2
(45) Date of Patent: Dec. 30, 2014

(54) SWITCHING BETWEEN DEDICATED FUNCTION HARDWARE AND USE OF A SOFTWARE ROUTINE TO GENERATE RESULT DATA

(75) Inventors: Simon Jones, London (GB); Andreas Engh-Halstvedt, Trondheim (NO); Aske Simon Christensen, Trondheim (NO)

(73) Assignee: ARM Limited, Cambridge (GB)

( * ) Notice: Subject to any disclaimer, the term of this patent is extended or adjusted under 35 U.S.C. 154(b) by 758 days.

(21) Appl. No.: 13/067,570

(22) Filed: Jun. 9, 2011

(65) Prior Publication Data
US 2012/0007878 A1 Jan. 12, 2012

(30) Foreign Application Priority Data
Jul. 7, 2010 (GB) ...................................... 1011419

(51) Int. Cl.
G06T 1/00 (2006.01)
G06F 13/14 (2006.01)
G06F 7/38 (2006.01)
G06F 9/30 (2006.01)
G06F 9/38 (2006.01)

(52) U.S. Cl.
CPC .......... *G06F 9/30189* (2013.01); *G06F 9/3877* (2013.01)
USPC ............................. 345/522; 345/520; 712/229

(58) Field of Classification Search
CPC ......... G06T 15/005; G06T 1/20; G06T 15/80; G06T 15/04; G06T 11/40; G06T 2200/28; G06T 15/503; G06F 11/0736
See application file for complete search history.

(56) References Cited

U.S. PATENT DOCUMENTS

| | | | |
|---|---|---|---|
| 5,197,138 A | 3/1993 | Hobbs et al. | |
| 6,898,692 B1 * | 5/2005 | Cameron et al. | 712/22 |
| 7,590,823 B1 | 9/2009 | Ansari et al. | |
| 8,174,531 B1 * | 5/2012 | Lindholm et al. | 345/506 |
| 8,433,884 B2 * | 4/2013 | Morishita | 712/225 |
| 2005/0140692 A1 * | 6/2005 | Swedberg et al. | 345/600 |

(Continued)

FOREIGN PATENT DOCUMENTS

| | | |
|---|---|---|
| GB | 1 182 548 | 10/2003 |
| GB | 2 429 084 | 2/2007 |

(Continued)

OTHER PUBLICATIONS

"Computer", JP 63157238, Kazuhiro Fujita (English translation).*

(Continued)

*Primary Examiner* — Carlos Perromat
*Assistant Examiner* — Nurun N Flora
(74) *Attorney, Agent, or Firm* — Nixon & Vanderhye P.C.

(57) ABSTRACT

An apparatus for processing data 2 is provided including processing circuitry 24 controlled by an instruction decoder 20 in response to a stream of program instructions. There is also provided dedicated function hardware 12 configured to receive output data from the processing circuitry and to perform a dedicated processing operation. The instruction decoder 20 is responsive to an end instruction 54 and a software processing flag (blend_shade_enabled) to control the processing circuitry to end a current software routine, to generate output data and in dependence upon the software processing flag either trigger processing of the output data by the dedicated function hardware or trigger the processing circuitry to perform a further software routine upon the output data to generate software generated result data instead of hardware generated result data as generated by the dedicated hardware circuitry.

16 Claims, 4 Drawing Sheets

(56) References Cited

U.S. PATENT DOCUMENTS

| | | | |
|---|---|---|---|
| 2006/0020771 A1* | 1/2006 | Kunimatsu et al. | 712/34 |
| 2009/0073177 A1* | 3/2009 | Jiao et al. | 345/501 |
| 2009/0271790 A1* | 10/2009 | Williams | 718/100 |
| 2009/0322764 A1* | 12/2009 | Saini et al. | 345/501 |
| 2011/0050697 A1* | 3/2011 | Shreiner | 345/426 |

FOREIGN PATENT DOCUMENTS

| | | |
|---|---|---|
| JP | S63-157238 | 6/1988 |
| JP | 2000-207202 | 7/2000 |
| JP | 2003-108989 | 4/2003 |
| JP | 2009-122925 | 6/2009 |
| JP | 2011-013783 | 1/2011 |

OTHER PUBLICATIONS

UK Search Report dated Oct. 6, 2010 for GB 1011419.7.

"Open GL—The Industry's Foundation for High Performance Graphics" Mar. 2008, www.opengl.org/discussion_boards, p. 1.

"Open GL—The Industry's Foundation for High Performance Graphics" Mar. 2008, www.opengl.org/discussion_boards, pp. 2-3.

English translation of Japanese Office Action mailed Feb. 24, 2014 in JP 2011-123344.

Japanese Office Action dated Oct. 6, 2014 in JP 2011-123344 and English translation, 7 pages.

\* cited by examiner

BRNDEND (target)
if (dependencies satisfied)
        if (blend_shader_enabled && in_fragment shader)
            in_fragment_shader = false
            branch to blend_shader_address else
            output colour value
            terminate thread else
        branch to target
```

FIG. 5

SWITCHING BETWEEN DEDICATED FUNCTION HARDWARE AND USE OF A SOFTWARE ROUTINE TO GENERATE RESULT DATA

This application claims priority to GB Application No. 1011419.7, filed 7 Jul. 2010, the entire contents of which is hereby incorporated by reference.

BACKGROUND OF THE INVENTION

1. Field of the Invention

This invention relates to the field of data processing systems. More particularly, this invention relates to data processing systems including processing circuitry for executing program instructions together with dedicated function hardware coupled to the processing circuitry for performing a dedicated processing operation.

2. Description of the Prior Art

It is known to provide data processing systems which include both a general purpose processor for executing a stream of program instructions together with dedicated function hardware. The dedicated function hardware may, for example, be accelerator hardware designed and provided to perform specific processing functions, such as compression or decompression of large quantities of media data. Another example would be a general purpose processor which is provided with a coprocessor for performing certain operations. In this case, if the coprocessor is not present in an implementation, then software seeking to utilise that coprocessor will typically trigger an exception and cause the processing that was to be performed by the coprocessor (dedicated function hardware) to instead be performed by emulation software running on the general purpose processor. Thus, the use of the coprocessor is dependent upon whether or not the coprocessor is present.

SUMMARY OF THE INVENTION

Viewed from one aspect the present invention provides an apparatus for processing data comprising:
  processing circuitry configured to perform data processing operations;
  instruction decoder circuitry coupled to said processing circuitry and responsive to a stream of program instructions to generate control signals to control said processing circuitry to perform said data processing operations; and
  dedicated function hardware coupled to said processing circuitry and configured to receive output data from said processing circuitry and to perform a dedicated processing operation upon said output data to generate hardware generated result data; wherein
  said instruction decoder circuitry is responsive to an end instruction and a software processing flag to generate control signals to control said processing circuitry to end a current software routine, to generate said output data and:
    (i) if said software processing flag has a first value, then to trigger said dedicated function hardware to receive said output data from said processing circuitry and to perform said dedicated processing operation to generate said hardware generated result data; or
    (ii) if said software processing flag has a second value, then to trigger said processing circuitry to perform a further software routine upon said output data to generate software generated result data instead of said hardware generated result data.

The present techniques recognise that even in embodiments in which the dedicated function hardware is always provided, there may be circumstances in which it is desirable not to use that dedicated function hardware and instead use a software routine to perform some desired processing. Furthermore, the present technique seeks to provide a mechanism to permit such a switch to the use of a software routine instead of the dedicated function hardware with a low hardware and performance overhead associated with the control of the switching. The current software routine ends with an end instruction and the instruction decoder responsible for decoding that end instruction is modified to be responsive to a flag indicating that a software routine should be used to trigger execution of that software routine. Otherwise, the default behaviour will be to use the dedicated function hardware which is always present. In this way, additional flexibility may be achieved whereby processing with particular characteristics not readily provided by the dedicated function hardware may instead be performed by a software routine.

It will be appreciated that the processing circuitry could comprise a single processor responsive to a stream of program instructions. Alternatively, the processing circuitry may comprise a plurality of processors and the instruction decoder circuitry may comprise a plurality of instruction decoders with each processor being coupled to a corresponding instruction decoder. Each of these processor and instruction decoder combinations may then be responsive to their own stream of program instructions. This provides a parallel execution environment.

It is possible that the current software routine and the further software routine could be executed by different processors. However, it is convenient that a common processor executes the current software routine and then follows this with execution of the further software routine as this will avoid the overhead and complication of having to switch processors as well as ensuring that data generated by the current software routine is available for use by the further software routine.

The processing performed by the system may be multithreaded. There may be multiple threads running on a single processor as well as multiple threads spread across multiple processors.

Whilst the present technique has a general applicability, it is well suited to use when the apparatus is dedicated graphics processing circuitry. Such dedicated graphics processing circuitry is typically highly computationally intensive with tasks that are broken down into multiple sections with some of these sections being well suited to being performed by dedicated function hardware whilst others are better performed by programmed general purpose processors.

Within this context of graphics processing circuitry, the current software routine may be a fragment shader generating output data which is a pixel colour value. In this case, the dedicated function hardware may be blend function hardware responsive to the output pixel colour value and at least a current pixel colour value stored within a frame buffer to generate a result pixel colour value to be stored within the frame buffer memory in place the current pixel colour value. Such fragment processing followed by blend processing is typical of a graphics processing environment. The present techniques facilitate that, if the blend function hardware which is provided is not able to provide desired processing characteristics, then the further software routine which may be triggered can be a blend shader which is responsive to the output pixel colour value and at least a current pixel colour value currently stored within the frame buffer memory to generate a result pixel value to be stored in the frame buffer memory in place of the current pixel colour value.

The dedicated function hardware may be responsive to one or more configuration parameters to modify the dedicated processing operation performed by the dedicated function hardware. Thus, the dedicated function hardware is capable of some variation in the processing it performs, but is not as flexible as a general purpose processor executing a stream of program instructions, such as the further software routine.

The way in which the dedicated function hardware may be triggered to commence its dedicated processing operation is by the storing of the output data into a memory with such a store operation being detected in hardware and then triggering the operation of the dedicated processing hardware.

The end instruction which terminates the current software routine may also be used to terminate the further software routine. This is efficient from an instruction encoding point of view. In this circumstance, a routine flag may be provided to indicate whether the processing circuitry is currently executing the current software routine. Thus, if the routine flag does not indicate that the processing circuitry is executing the current software routine, then triggering of execution of the further software routine will be suppressed.

A programmable branch address may be stored as a configuration parameter specifying a start address of the further software routine.

The end instruction may be arranged such that it triggers a branch to a target address specified by the end instruction itself until one or more predetermined dependency conditions are satisfied. Thus, the commencement of processing by the dedicated function hardware, or the further software routine, may be gated upon the one or more predetermined dependency conditions by having the end instructions perform its branch functionality instead of triggering processing by the dedicated function hardware or by the further software routine.

Viewed from a further aspect the present invention provides an apparatus for processing data comprising:
 processing means for performing data processing operations;
 instruction decoding means for generating control signals to control said processing circuitry to perform said data processing operations in response to a stream of program instructions; and
 dedicated function hardware means for receiving output data from said processing means and for performing a dedicated processing operation upon said output data to generate hardware generated result data; wherein
 said instruction decoding means is responsive to an end instruction and a software processing flag to generate control signals to control said processing means to end a current software routine, to generate said output data and:
  (i) if said software processing flag has a first value, then to trigger said dedicated function hardware means to receive said output data from said processing means and to perform said dedicated processing operation to generate said hardware generated result data; or
  (ii) if said software processing flag has a second value, then to trigger said processing means to perform a further software routine upon said output data to generate software generated result data instead of said hardware generated result data.

Viewed from a further aspect the present invention provides a method of processing data comprising the steps of:
 performing data processing operations using processing circuitry;
 decoding a stream of program instructions to generate control signals to control said processing circuitry to perform said data processing operations; and
 receiving output data from said processing circuitry and for performing a dedicated processing operation upon said output data to generate hardware generated result data using dedicated function hardware; wherein
 said decoding steps is responsive to an end instruction and a software processing flag to generate control signals to control said processing means to end a current software routine, to generate said output data and:
  (i) if said software processing flag has a first value, then to trigger said dedicated function hardware to receive said output data from said processing means and to perform said dedicated processing operation to generate said hardware generated result data; or
  (ii) if said software processing flag has a second value, then to trigger said processing means to perform a further software routine upon said output data to generate software generated result data instead of said hardware generated result data.

The above, and other objects, features and advantages of this invention will be apparent from the following detailed description of illustrative embodiments which is to be read in connection with the accompanying drawings.

DESCRIPTION OF THE EMBODIMENTS

Figure 1:
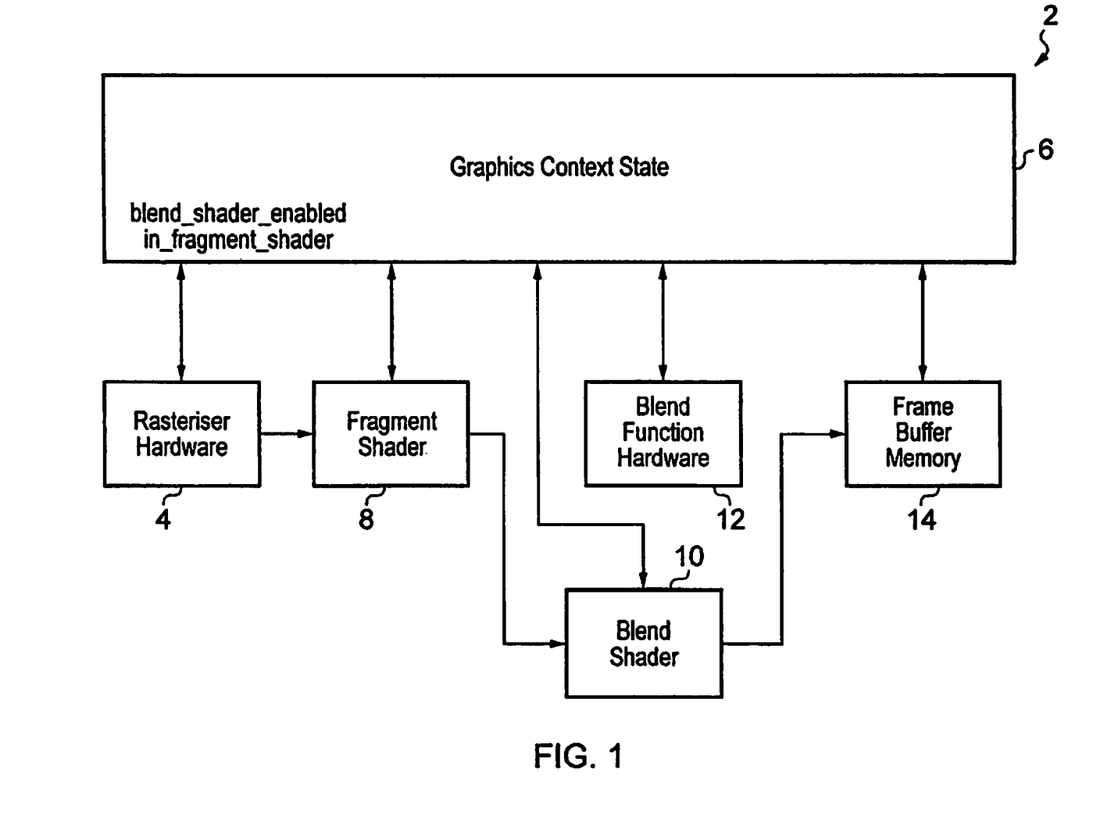
FIG. 1 schematically illustrates a portion of a graphics processing system including both dedicated function hardware and a further software routine to be used in place of the dedicated function hardware.

FIG. 1 schematically illustrates a graphics processing system 2. Rasterizer hardware 4 is responsible for reading graphics context state 6 specifying graphics primitives to be drawn (e.g. primitive triangles) and generating from these a stream of graphics fragments typically corresponding to a pixel to be drawn as part of the representation of the graphics primitive that has been rasterized. It will be appreciated that further graphics processing operations may be been performed prior to the action of the rasterizer hardware 4, such a spatial transformations, vertex and primitive sorting etc.

The rasterizer hardware 4 generates a stream of data identifying fragments (pixels) to be drawn. These are passed to fragment shader software 8 for a determination of the pixel colour value associated with each fragment. The fragment shader 8 is provided in the form of a software routine running on a general purpose processor of the graphics processing system 2. Typically, many general purpose processors will be provided in parallel within the graphics processing system so that multiple pixels may be processed in parallel and other processing operations performed in parallel.

The fragment shader 8 (current software routine) finishes with an end instruction. This end instruction branches back to itself until predetermined dependency conditions are met. In this way, further processing of a pixel colour value generated by the fragment shader 8 may be delayed until the proper point in the processing sequence is reached (corresponding to all the dependencies being met) and the pixel colour value can be passed forward for blending.

The end instruction which is decoded by an instruction decoder within the general purpose processor which is executing the fragment shader. The instruction decoder executing produces control signals which control how the blend processing is performed. The graphics context state 6 associated with the processing of that pixel value (an individual processing thread) includes a blend_shader_enabled flag as well as an in_fragment_shader flag. If when the end instruction is decoded the blend_shader_enabled flag is true, then this indicates that the blend processing should be performed by a blend shader 10 (further software routine) rather than dedicated blend function hardware 12. Both the dedicated blend function hardware 12 and the blend shader 10 are provided within the system. Thus, if the blend_shader_enabled flag is true then, the blend shader 10 will process the pixel colour value to perform the blend operation with a current pixel value at a corresponding position within a frame buffer memory 14 to produce a software generated result pixel colour value which is written back to the corresponding position within the frame buffer memory 14. Alternatively, if the blend_shader_enabled flag is false, then the pixel colour value is processed by the dedicated blend function hardware 12 which is present by default to generate a hardware generated result pixel colour value which is again written to the frame buffer memory 14. Thus, the same end instruction within the fragment shader 8 (current software routine) may be used to trigger either use of the dedicated blend function hardware 12 or the blend shader 10 (further software routine) in dependence upon the blend_shader_enabled flag.

A further feature is the use of the in_fragment_shader flag. This is provided as the same end instructions can be used to terminate both the fragment shader 8 and the blend shader 10. When terminating the blend shader 10, it is inappropriate to trigger processing of the output from the blend shader 10 by a further blend shader 10. Thus, the end instruction will only invoke the blend shader 10 if the in_fragment_shader flag indicates that the general purpose processor was executing the fragment shader 8 when that end instruction was encountered and decoded.

Figure 2:
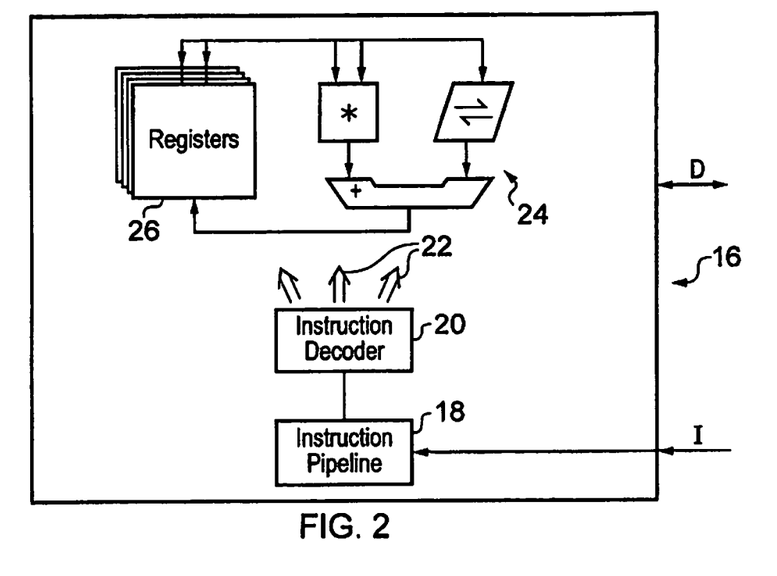
FIG. 2 schematically illustrates a general purpose processor responsive to a stream of program instructions.

FIG. 2 illustrates a general purpose processor 16 within a graphics processing unit of the type which may be used to execute the fragment shader 8 and/or the blend shader 10. Program instructions constituting the fragment shader 8 or the blend shader 10 are supplied to an instruction pipeline 18. An instruction decoder 20 is responsive to these program instructions to generate control signals 22 which control the processing operations performed by a data path 24 in processing data values stored within registers 26. The instruction decoder 20 can also control the processor 16 to store data to a separate memory and to read data from that separate memory. The registers 26 are illustrated in banked form indicative of a multi-threading capability of the processor 16 being facilitated by the use of switching between different registers banks when switching between different threads of execution (different streams of program instructions).

Figure 3:
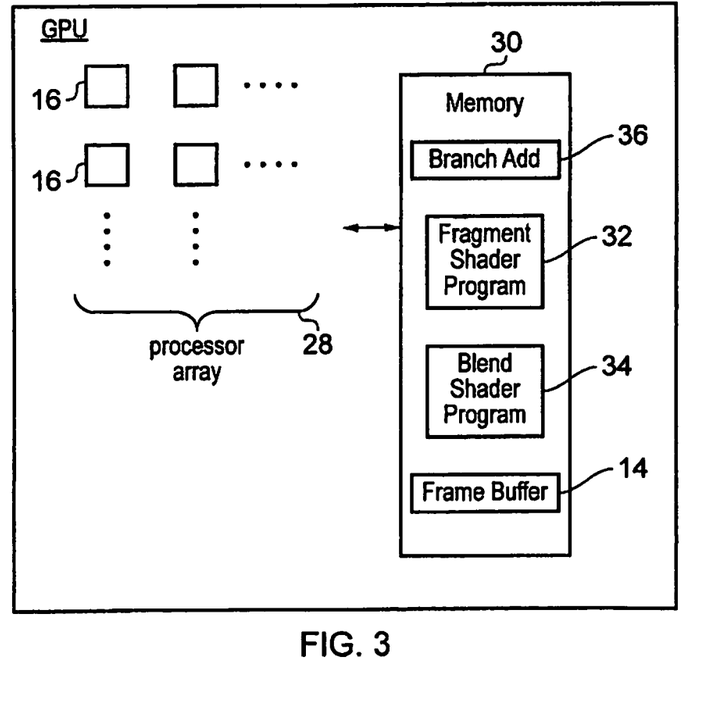
FIG. 3 schematically illustrates a graphics processing apparatus including an array of processors and a memory storing graphics context state and other data associated with the graphics processing.

FIG. 3 illustrates a graphics processing unit including an array 28 of the processor 16. Such an array 28 facilitates highly parallel processing of a type well suited for graphics processing operations. A memory 30 stores the fragment shader program 32 and the blend shader program 34 which is executed by individual instances of the processor 16. The memory 30 also includes the frame buffer 14 into which the result pixel colour values are assembled by the blend processing. The memory 30 further stores the graphics context state 6 together with a programmable branch target address 36 which indicates the start address of the blend shader program 34 which is to be executed when the end instruction triggers use of the further software routine (blend shader 10).

Figure 4:
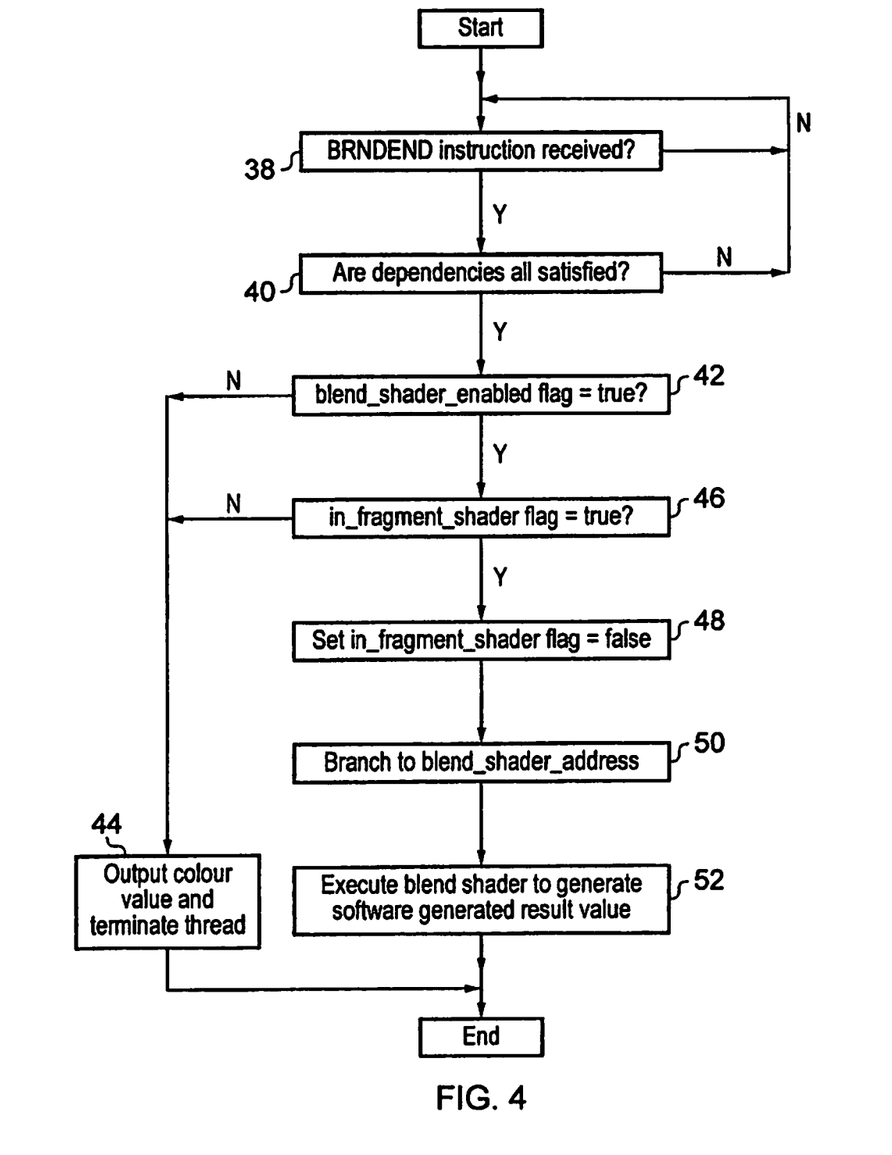
FIG. 4 is a flow diagram schematically illustrating the operation of an instruction decoder upon decoding an end instruction.

FIG. 4 is a flow diagram schematically illustrating the decoding of an end instruction. The end instruction has the mnemonic BRNDEND (branch no dependencies end). Step 38 waits until the end instruction is received. When the end instruction is received, then step 40 determines whether or not all the dependencies associated with that processing thread (and thereby with the end instruction) have been satisfied. When all the dependencies are not satisfied, processing returns to step 38.

When all of the dependencies are satisfied at step 40, then processing proceeds to step 42 where a determination is made as to whether the blend_shader_enabled flag is true. If the blend_shader_enabled flag is false, then processing proceeds to step 44 where the colour pixel value from the fragment shader 8 is output (e.g. written to the memory 30) and the fragment shader thread 8 for calculating that pixel colour value is terminated. The writing of the pixel colour value to the memory 30 triggers the dedicated blend function hardware 12 to read that pixel colour value from the memory 30 and commence its dedicated processing operation thereupon.

If the determination at step 42 is that the blend_shader_enabled flag is true, then processing proceeds to step 46 where a determination is made as to whether or not the in_fragment_shader flag is true. If the in_fragment_shader flag is false, then processing again proceeds to step 44. In this case the colour pixel value will again be output and the thread will be terminated. However, as the thread terminated is not a fragment shader 8, then it is inappropriate to invoke processing by the dedicated blend function hardware 12. The location to which the colour pixel value is stored as well as other state data serves to indicate whether or not the dedicated blend function hardware 12 should be invoked upon output of the colour pixel value at step 44.

If the determination at step 46 is that the in_fragment_shader flag is true, then processing proceeds to step 48 where the in_fragment_shader flag is set false. This is because the blend shader 10 is about to be invoked and accordingly the in_fragment_shader flag should indicate that the program instruction controlled processing that is about to take place is not fragment shader processing. Step 50 is a branch to a target address indicated by a blend_shader_address stored within the memory 30 and corresponding to a start address of the blend shader program 34. Step 52 executes the blend shader 10 and generates a result pixel colour value which is again written to the frame buffer memory 14.

Figure 5:
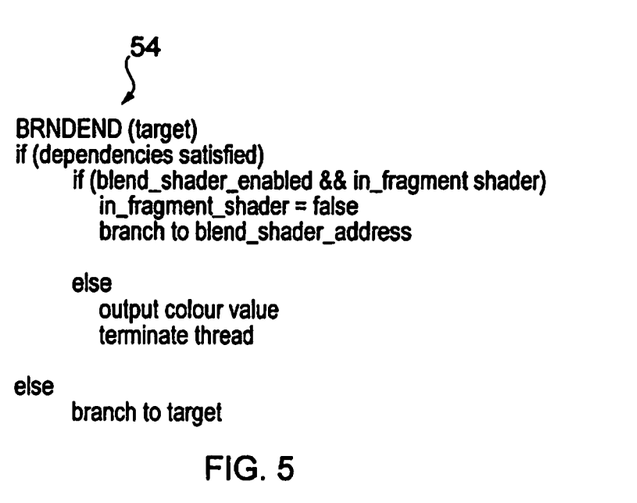
FIG. 5 is pseudo-code illustrating the functionality of an end instruction in accordance with one embodiment of the present techniques.

FIG. 5 is pseudo code schematically illustrating the processing operations performed when an end-instruction 54 is decoded. These processing operations are as illustrated in FIG. 4.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
    processing circuitry configured to perform data processing operations;
    instruction decoder circuitry coupled to said processing circuitry and responsive to a stream of program instructions to generate control signals to control said processing circuitry to perform said data processing operations; and
    dedicated function hardware coupled to said processing circuitry and configured to receive output data from said processing circuitry and to perform a dedicated processing operation upon said output data to generate hardware generated result data; wherein
    said instruction decoder circuitry is responsive to an end instruction and a software processing flag to generate control signals to control said processing circuitry to end a current software routine, to generate said output data and:
    (i) if said software processing flag has a first value, then to trigger said dedicated function hardware to receive said output data from said processing circuitry and to perform said dedicated processing operation to generate said hardware generated result data; or
    (ii) if said software processing flag has a second value, then to trigger said processing circuitry to perform a further software routine upon said output data to generate software generated result data instead of said hardware generated result data.

2. Apparatus as claimed in claim 1, wherein said processing circuitry comprises a plurality of processors, said instruction decoder circuitry comprises a plurality of instruction decoders and each processor of said plurality of processors is coupled to one of said plurality of instruction decoders, said instruction decoder being responsive to a stream of program instructions to generate control signals to control said processor.

3. Apparatus as claimed in claim 2, wherein said current software routine and said further software routine are performed by a common one of said plurality of processors.

4. Apparatus as claimed in claim 2, wherein each of said processors performs a plurality of threads of processing in response to a plurality of streams of program instructions.

5. Apparatus as claimed in claim 1, wherein said processing circuitry performs a plurality of threads of processing in response to a plurality of streams of program instructions.

6. Apparatus as claimed in claim 1, wherein said apparatus is dedicated graphics processing circuitry.

7. Apparatus as claimed in claim 6, wherein said current software routine is a fragment shader and said output data is an output pixel colour value.

8. Apparatus as claimed in claim 7, wherein said dedicated function hardware is blend function hardware responsive to said output pixel colour value and at least a current pixel colour value currently stored within a frame buffer memory to generate a result pixel colour value to be stored in said frame buffer memory in place of said current pixel colour value.

9. Apparatus as claimed in claim 8, wherein said further software routine is a blend shader responsive to said output pixel colour value and at least the current pixel colour value currently stored within the frame buffer memory to generate the result pixel colour value to be stored in said frame buffer memory in place of said current pixel colour value.

10. Apparatus as claimed in claim 1, wherein said dedicated function hardware is responsive to one or more configuration parameters to modify said dedicated processing operation performed by said dedicated function hardware.

11. Apparatus as claimed in claim 1, wherein if said software processing flag has said first value, then said end instruction triggers said processing circuitry to store said output data to a memory thereby triggering said dedicated function hardware to read said output data from said memory and perform said dedicated processing operation.

12. Apparatus as claimed in claim 1, wherein said end instruction terminates said current software routine and said further software routine and said instruction decoder circuitry when decoding said end instruction is responsive to a routine flag indicative of whether said processing circuitry is currently executing said current software routine to suppress triggering execution of said further software routine if said routine flag does not indicate that said processing circuitry is executing said current software routine.

13. Apparatus as claimed in claim 1, wherein said instruction decoder is responsive to a programmable branch address stored as a configuration parameter of said apparatus and specifying a start address of said further software routine.

14. Apparatus as claimed in claim 1, wherein said end instruction branches to a target address specified by said end instruction until one or more predetermined dependency conditions are satisfied.

15. Apparatus for processing data comprising:
    processing means for performing data processing operations;
    instruction decoding means for generating control signals to control said processing circuitry to perform said data processing operations in response to a stream of program instructions; and
    dedicated function hardware means for receiving output data from said processing means and for performing a dedicated processing operation upon said output data to generate hardware generated result data; wherein
    said instruction decoding means is responsive to an end instruction and a software processing flag to generate control signals to control said processing means to end a current software routine, to generate said output data and:
    (i) if said software processing flag has a first value, then to trigger said dedicated function hardware means to receive said output data from said processing means and to perform said dedicated processing operation to generate said hardware generated result data; or
    (ii) if said software processing flag has a second value, then to trigger said processing means to perform a further software routine upon said output data to generate software generated result data instead of said hardware generated result data.

16. A method of processing data comprising the steps of:
    performing data processing operations using processing circuitry;
    decoding a stream of program instructions to generate control signals to control said processing circuitry to perform said data processing operations; and
    receiving output data from said processing circuitry and performing a dedicated processing operation upon said output data to generate hardware generated result data using dedicated function hardware; wherein
    said decoding step is responsive to an end instruction and a software processing flag to generate control signals to control said processing circuitry to end a current software routine, to generate said output data and:
    (i) if said software processing flag has a first value, then to trigger said dedicated function hardware to receive said output data from said processing circuitry and to perform said dedicated processing operation to generate said hardware generated result data; or (ii) if said software processing flag has a second value, then to trigger said processing circuitry to perform a further software routine upon said output data to generate software generated result data instead of said hardware generated result data, wherein said end instruction terminates said current software routine and said further software routine and said instruction decoder circuitry when decoding said end instruction is responsive to a routine flag indicative of whether said processing circuitry is currently executing said current software routine to suppress triggering execution of said further software routine if said routine flag does not indicate that said processing circuitry is executing said current software routine.

* * * * *